Dec. 1, 1925 Re. 16,219
V. L. FORSYTH
SELF ALIGNING PITMAN BEARING BOX
Original Filed May 31, 1924
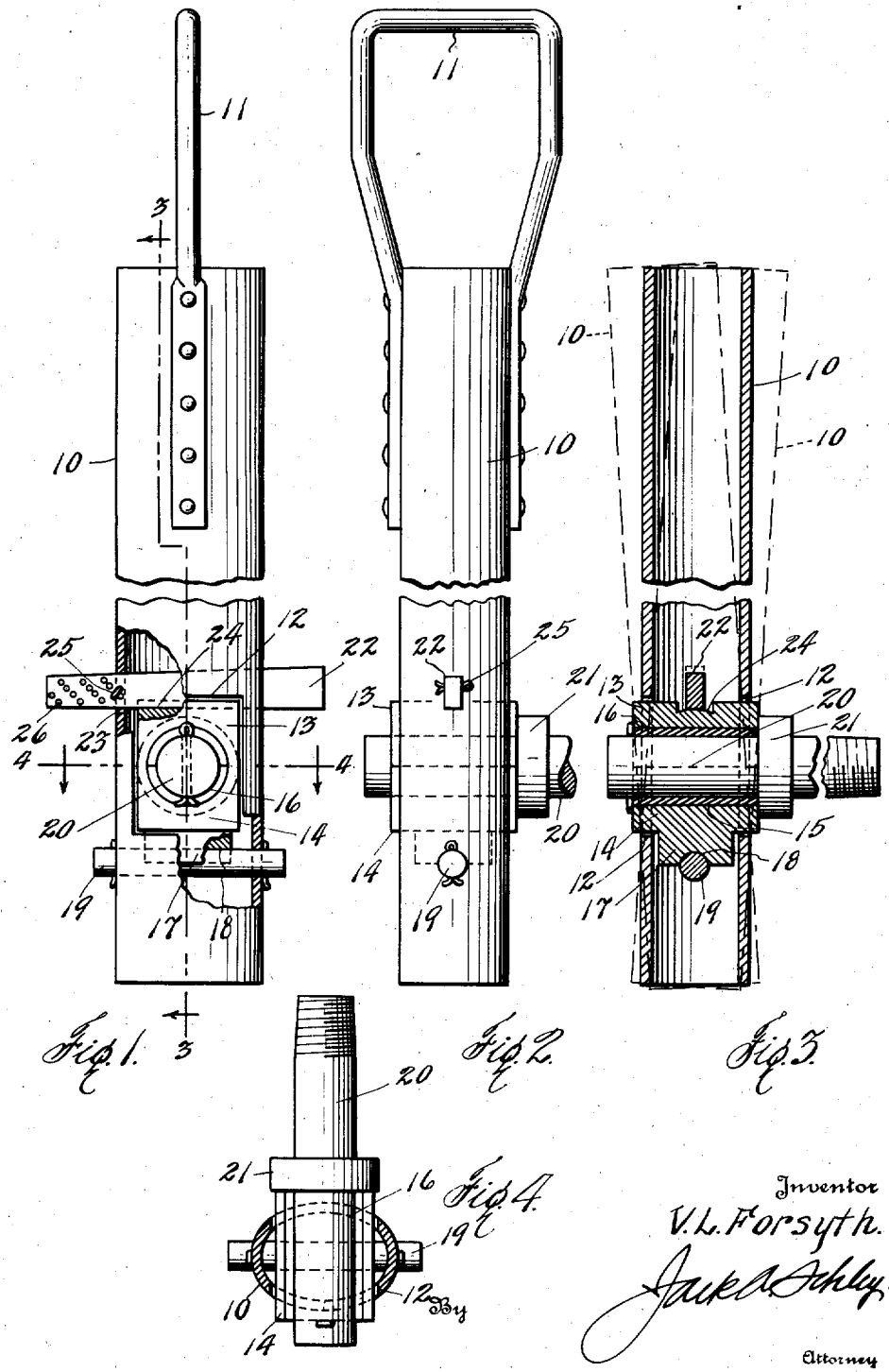
Inventor
V. L. Forsyth.
By Jack A. Ashley.
Attorney Reissued Dec. 1, 1925. Re. 16,219

UNITED STATES PATENT OFFICE.

VALORIS L. FORSYTH, OF FORT WORTH, TEXAS.

SELF-ALIGNING PITMAN BEARING BOX.

Original No. 1,538,318, dated May 19, 1925, Serial No. 716,931, filed May 31, 1924. Application for reissue filed October 5, 1925. Serial No. 60,682.

*To all whom it may concern:*

Be it known that I, VALORIS L. FORSYTH, a citizen of the United States, residing at Fort Worth, in the county of Tarrant and State of Texas, have invented new and useful Improvements in Self-Aligning Pitman Bearing Boxes, of which the following is a specification.

This invention relates to new and useful improvements in self-aligning pitman bearing boxes.

The invention has particularly to do with pitmen which are used in connection with the walking beams of well drilling rigs and pumps. These pitmen have considerable length and there is more or less play, with the result that the wrist pin works under an undue strain and is frequently bent or broken.

The object of the invention is to provide in the pitman, a bearing box for the wrist pin, mounted to rock or move so as to align its bearing surfaces with the pin and thus compensate variations in the alignment of the pitman.

A further object is to provide a bearing box having means for snugly adjusting its bearing members to the pin, thus taking up wear and arranged to move bodily with the pin so as not to bind, twist or break the latter, when the pitman is moved out of line; also whereby the pin is not subjected to distortion in its bearing and a free working is thus obtained.

A construction designed to carry out the invention together with other novel features will be hereinafter described.

The invention will be more readily understood from a reading of the following specification and by reference to the accompanying drawings in which an example of the invention is shown, and wherein:

Fig. 1 is a side elevation of a pitman constructed in accordance with my invention, Fig. 2 is a front elevation of the same, Fig. 3 is a vertical sectional view on the line 3—3 of Fig. 1, and Fig. 4 is a cross-sectional view on the line 4—4 of Fig. 1.

In the drawings the numeral 10 designates a tubular pitman which is flattened to exhibit an elliptical shape in cross-section, although said pitman may assume other shapes. At its upper end the pitman has a stirrup 11 by which it is suspended from the end of the walking beam (not shown). Near the lower end the pitman has opposite rectangular openings 12 through which the ends of a bearing box project. This box comprises an upper member 13 and a lower member 14 divided at the center of the box. Each member has a semi-cylindrical seat 15 for receiving a bearing member 16 of suitable metal. The members 16 when assembled provide a cylindrical bore or bearing surface. The details of the foregoing parts may vary according to the conditions of use and manufacture.

In order that the box may rock or oscillate the lower member has a reduced boss 17 disposed transversely of the bore of the bearing members 16. The boss has a longitudinal concaved recess 18 in its under surface, whereby the boss may fulcrum on a pin 19 extending transversely through the pitman and suitably secured therein. Sufficient clearance in the openings 12 around the box is provided so that the box may rock freely.

A wrist pin 20 of the usual construction has its collar 21 bearing against the end of the box. For holding the members of the box together a wedge 22 is passed through slots 23 in the pitman parallel to the pin 19. The upper member 13 of the box has a transverse groove 24 provided with a convex bottom cut on a radius having its center coincident with the center of the pin 19. The under edge of the wedge is curved to conform to the contour of the bottom of the groove.

The wedge is driven in to hold the box and its bearing members in contact with the wrist pin 20 and a cotter pin 25 is passed through one of a series of holes 26 in the wedge to keep the latter in place. It will be seen that the box may rock on the pin 19 because the bottom of the groove 24 will ride under the wedge. This oscillation will be ample to compensate for any variation of the pitman from its perpendicular position with relation to the wrist pin. It is obvious that the bearing box is adequately supported and a proper bearing is had for the wrist pin 20. Whenever the pitman is distorted the box will retain its alignment with the wrist pin 20, thus avoiding undue friction, strains and breaks.

Various changes in the size and shape of the parts may be made within the scope of the appended claims. The pitman need not be tubular or flattened, but may be otherwise constructed to receive the box.

What I claim, is:

1. The combination with a pitman having openings in its opposite sides, of a wrist pin box extending through said openings, a fulcrum support for the lower portion of the box on which said box is mounted to rock, and means for confining said box on its fulcrum support and holding it in position in the pitman.

2. The combination with a pitman having openings in its opposite sides, of a wrist pin box extending through said openings, a fulcrum support for the lower portion of the box on which said box is mounted to rock, and a fastening device in the pitman with which the upper portion of the box has rocking engagement.

3. The combination with a pitman having openings in its opposite sides, of a divided bearing box for a wrist pin, a boss on the lower end of the box, a transverse pin in the pitman on which the boss is fulcrumed, the upper end of the box having a groove provided with a convex bottom surface, and a wedge mounted in the pitman and engaging in said groove which has a width greater than the thickness of the wedge.

4. The combination with a pitman having an opening therethrough, of a wrist pin box extending through said opening, a fulcrum support for the lower portion of the box on which said box is mounted to rock, and means for confining said box on its fulcrum support and holding it in position in the pitman.

5. The combination with a pitman having an opening therethrough, of a wrist pin box extending through said opening, a fulcrum support for the lower portion of the box on which said box is mounted to rock, and a fastening device in the pitman with which the upper portion of the box has rocking engagement.

6. The combination with a pitman having an opening therethrough, of a divided bearing box for a wrist pin, a boss on the lower end of the box, a transverse pin in the pitman on which the boss is fulcrumed, the upper end of the box having a groove provided with a convex bottom surface, and a wedge mounted in the pitman and engaging in said groove which has a width greater than the thickness of the wedge.

In testimony whereof I affix my signature.

VALORIS L. FORSYTH.